(12) United States Patent
Lo et al.

(10) Patent No.: US 8,172,405 B2
(45) Date of Patent: May 8, 2012

(54) LAMP AND OPTICAL PROJECTOR

(75) Inventors: Wei-Cheng Lo, Hsinchu (TW);
Jung-Chi Chen, Hsin-Chu (TW);
Jih-Ching Chang, Hsin-Chu (TW);
Kai-Lun Hou, Hsinchu (TW)

(73) Assignees: Young Green Energy Co., Hsinchu County (TW); Coretronic Corporation, Hsin-Chu (TW)

( * ) Notice: Subject to any disclaimer, the term of this patent is extended or adjusted under 35 U.S.C. 154(b) by 477 days.

(21) Appl. No.: 12/556,751

(22) Filed: Sep. 10, 2009

(65) Prior Publication Data
US 2010/0079732 A1  Apr. 1, 2010

(30) Foreign Application Priority Data
Oct. 1, 2008 (TW) ................................ 97137658 A (51) Int. Cl.
*G03B 21/16* (2006.01)
*F21V 29/00* (2006.01)
(52) U.S. Cl. ........ 353/57; 353/61; 362/294; 362/296.01
(58) Field of Classification Search .................. 353/57, 353/58, 60, 61; 362/294, 296.01–296.1, 362/341–350
See application file for complete search history.

(56) References Cited

U.S. PATENT DOCUMENTS

| 7,775,689 B2 * | 8/2010 | Nishimura et al. | 362/345 |
| 7,922,335 B2 * | 4/2011 | Sakai et al. | 353/58 |
| 2006/0232973 A1 | 10/2006 | Haga et al. | |
| 2007/0242453 A1 * | 10/2007 | Suzuki | 362/218 |

FOREIGN PATENT DOCUMENTS

| JP | 2003207849 A | 7/2003 |
| TW | 511721 | 11/2002 |
| TW | 558021 | 10/2003 |

* cited by examiner

*Primary Examiner* — William C Dowling
(74) *Attorney, Agent, or Firm* — Chun-Ming Shih (57) ABSTRACT

A lamp includes a lampwick, a reflector, and a shade. The reflector has an opening and a bottom portion opposite to the opening. The lampwick is disposed at the bottom portion and passes through the bottom portion and at least one part of the lampwick is disposed in the reflector. The shade disposed outside the reflector covers a part of the reflector. The shade connected to the bottom portion has an inlet and an outlet. The inlet and the outlet are disposed at two opposite sides of the reflector respectively. An air flow flows into the space between the reflector and the shade through the inlet. At least one part of the air flow flows through the outlet along a flowing direction. An included angle defined between the flowing direction and a transmitting direction of an illumination light beam formed by the reflector is an acute angle.

18 Claims, 7 Drawing Sheets

LAMP AND OPTICAL PROJECTOR

BACKGROUND

This application claims priority to a Taiwan application No. 097137658 filed on Oct. 1, 2008.

1 Technical Field

The present invention relates to a lamp and in particular relates to an optical projector having the lamp.

2 Description of the Related Art

Figure 1A:
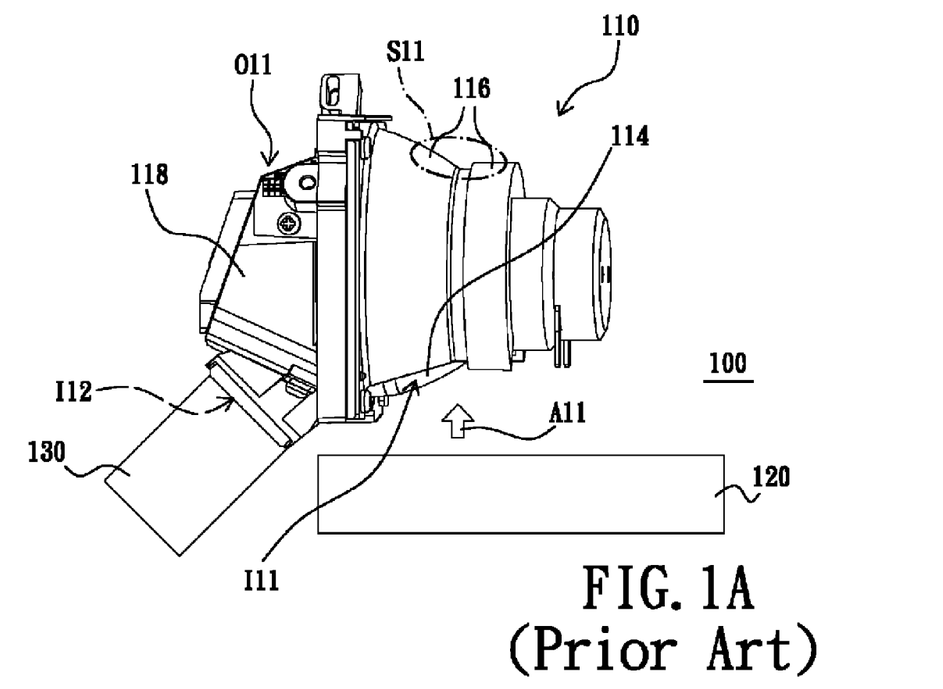
FIG. 1A is a schematic top view of a conventional illuminant module.
Figure 1B:
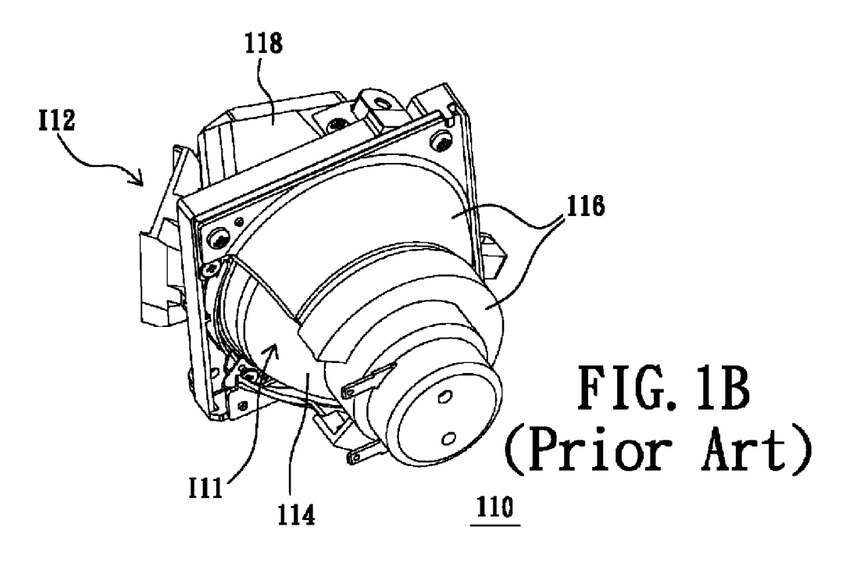
FIG. 1B is a schematic three-dimensional view of a lamp of FIG. 1A.
Figure 1C:
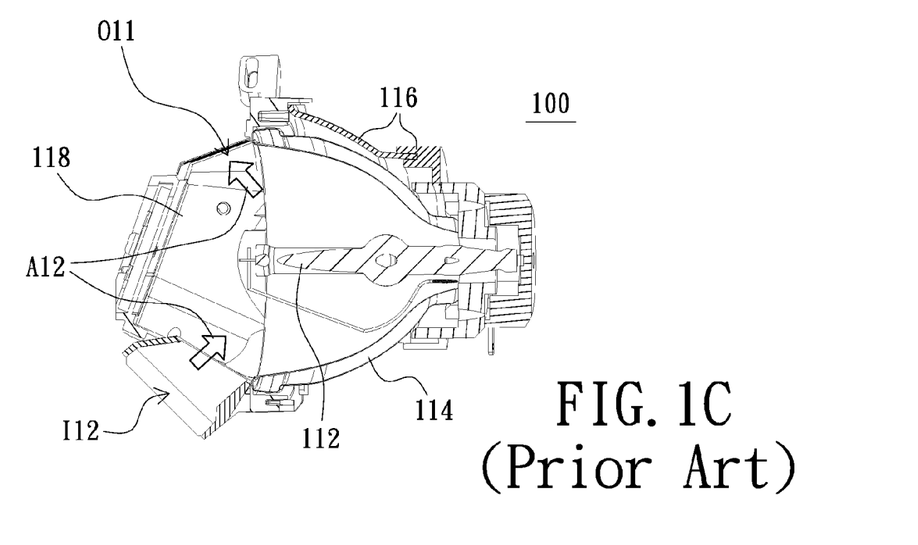
FIG. 1C is a schematic cutaway view of the lamp of FIG. 1A.

FIG. 1A is a schematic top view of a conventional illuminant module. FIG. 1B is a schematic three-dimensional view of a lamp of FIG. 1A. FIG. 1C is a schematic cutaway view of the lamp of FIG. 1A. Referring to FIG. 1A, FIG. 1B, and FIG. 1C, the conventional illuminant module 100 includes a lamp 110, a first airflow generator 120, and a second airflow generator 130. The lamp 110 includes a lampwick 112, a reflector 114, a shade 116, and a protector 118. The shade 116 is disposed outside the reflector 114 and covers a part of the reflector 114. The shade 116 has a first inlet I11. The protector 118 has a second inlet I12 and a first outlet O11.

The first airflow generator 120 is adjacent to the first inlet I11 and adapted to generate a first air flow A11. The first air flow A11 flows into the space between the reflector 114 and the shade 116 through the first inlet I11. The second airflow generator 130 is adjacent to second inlet I12 and adapted to generate a second air flow A12. The second air flow A12 flows through the second inlet I12, the interior of the reflector 114, and the first outlet O11.

However, when the illuminant module 100 operates, the first air flow A11 flowing into the space between the reflector 114 and the shade 116 does not easily flow out of the space. Consequently, the temperature of a side S11 of the reflector 114 and the shade 116 opposite to the first airflow generator 120 is relatively high and the shade 116 is easily deformed. In other words, the heat-dissipating efficiency of the conventional lamp 110 is relatively low.

BRIEF SUMMARY

The present invention provides a lamp, and the heat-dissipating efficiency of the lamp is improved.

The present invention provides an optical projector, and the heat-dissipating efficiency of the lamp of the optical projector is improved.

Other advantages and objects of the present invention may be further comprehended through the technical features disclosed in the present invention.

In order to achieve one or part of or all the objectives or other objectives, in an embodiment of the present invention, the lamp includes a lampwick, a reflector, and a shade. The reflector has a first opening and a bottom portion opposite to the first opening. The lampwick is disposed at the bottom portion and passes through the bottom portion and at least one part of the lampwick is disposed in the reflector. The reflector is capable of making the light emitted by the lampwick form an illumination light beam passing through the first opening. The shade is disposed outside the reflector and covers a part of the reflector. The shade is connected to the bottom portion and has a first inlet and a first outlet. The first inlet and the first outlet are disposed at two opposite sides of the reflector respectively. A first air flow is adapted to flow into the space between the reflector and the shade through the first inlet. At least one part of the first air flow flows through the first outlet along a first flowing direction. A first included angle defined between the first flowing direction and a transmitting direction of the illumination light beam is an acute angle.

In order to achieve one or part of or all the objectives or other objectives, in an embodiment of the present invention, the optical projector includes an illuminant module, a light valve, and a projection lens. The illuminant module includes the above lamp and a first airflow generator. The first airflow generator is adjacent to the first inlet and adapted to generate the first air flow. The light valve is disposed in a transmitting path of the illumination light beam and adapted to convert the illumination light beam into an image light beam. The projection lens is disposed in a transmitting path of the image light beam and adapted to project the image light beam onto a screen.

When the illuminant module of the optical projector operates, the first air flow flowing into the space between the reflector and the shade may flow out of the space through the first outlet of the shade. Accordingly, compared with the conventional arts, the temperature of a side of the reflector and the shade opposite to the first airflow generator may be reduced and the shade may be avoided being deformed due to high temperature. In other words, the heat-dissipating efficiency of the lamp of the embodiment of the present invention is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 2:
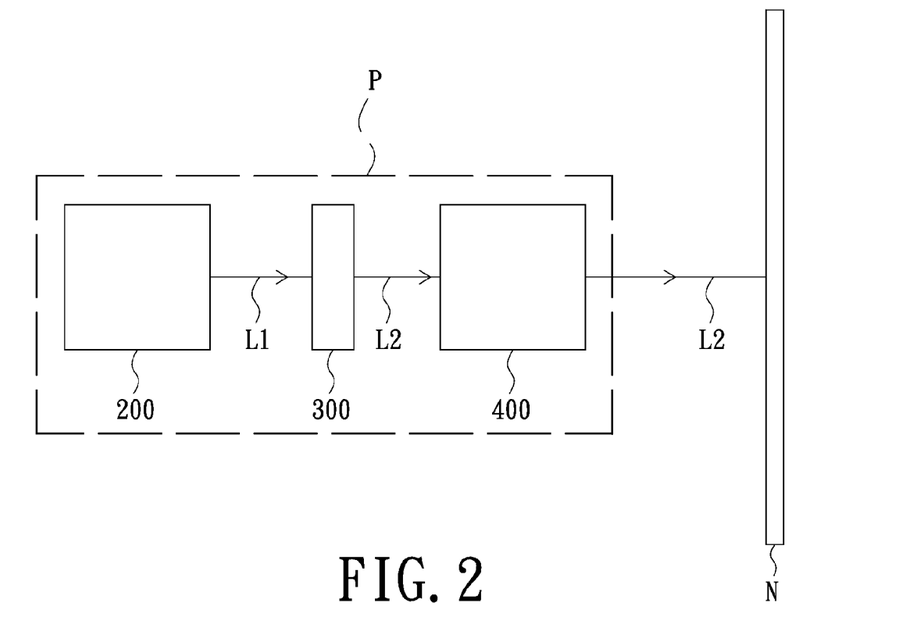
FIG. 2 is a schematic view of an optical projector in accordance with a first embodiment of the present invention.

FIG. 2 is a schematic view of an optical projector in accordance with a first embodiment of the present invention. Referring to FIG. 2, an optical projector P of the first embodiment includes an illuminant module 200, a light valve 300, and a projection lens 400. The illuminant module 200 is adapted to emit an illumination light beam L1. The light valve 300 is disposed in a transmitting path of the illumination light beam L1. The light valve 300 is adapted to convert the illumination light beam L1 into an image light beam L2. The projection lens 400 is disposed in a transmitting path of the image light beam L2. The projection lens 400 is adapted to project the image light beam L2 onto a screen N.

Figure 3A:
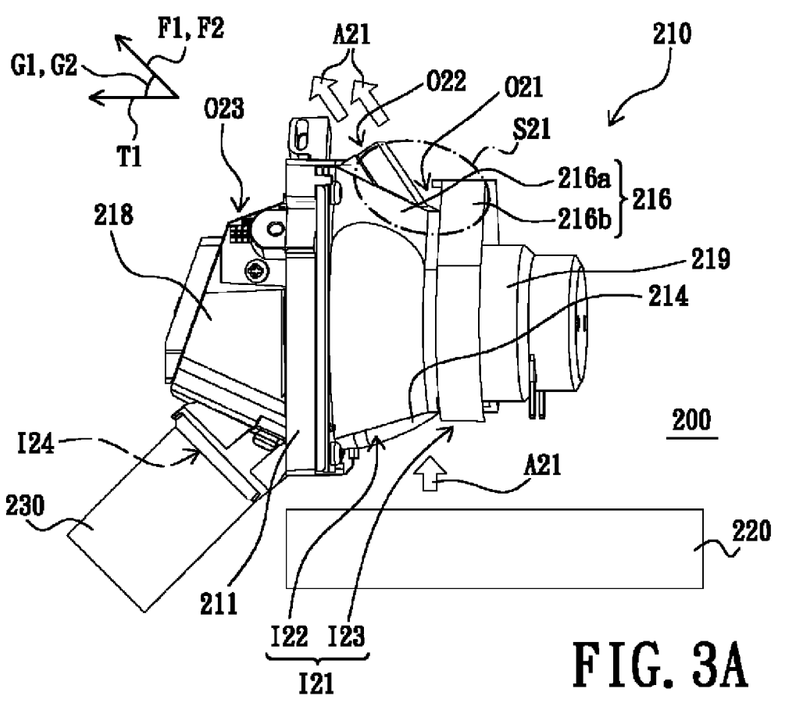
FIG. 3A is a schematic top view of an illuminant module of FIG. 2.
Figure 3B:
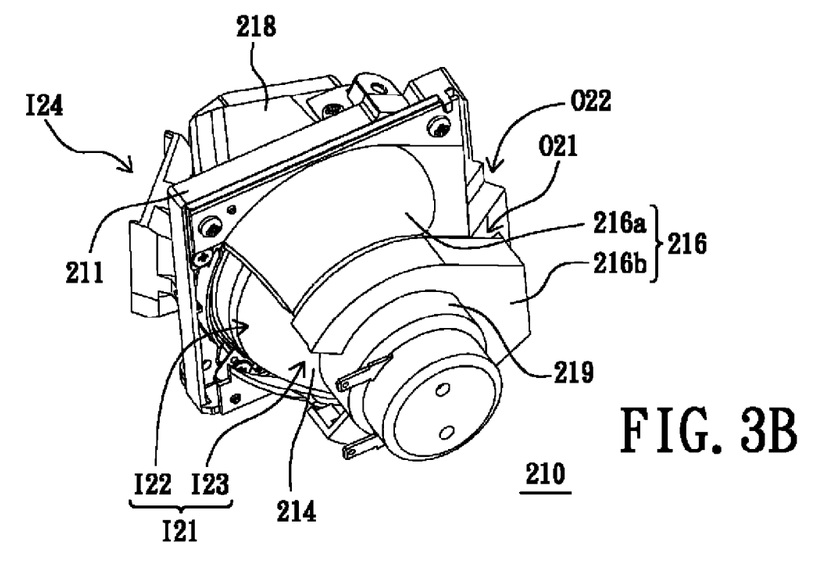
FIG. 3B is a schematic three-dimensional view of a lamp of FIG. 3A.
Figure 3C:
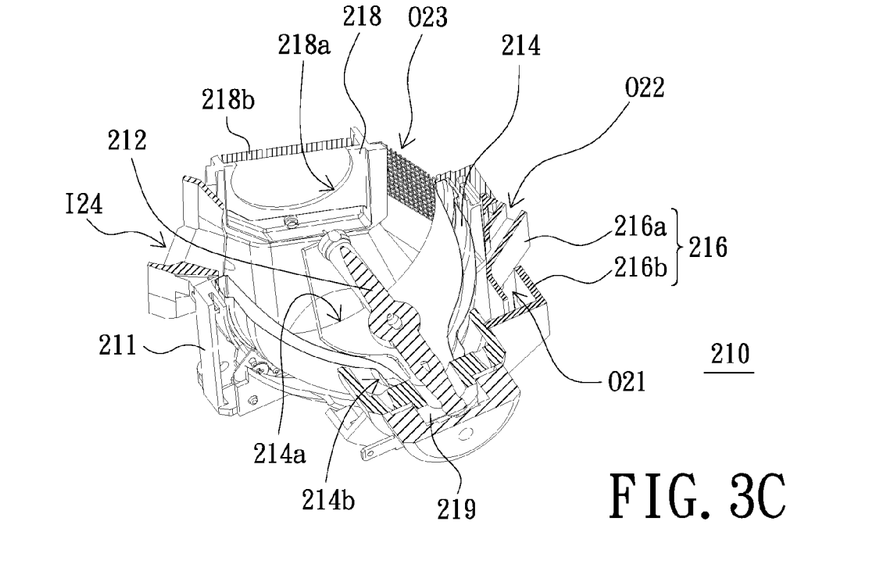
FIG. 3C is a schematic cutaway three-dimensional view of the lamp of FIG. 3A.
Figure 3D:
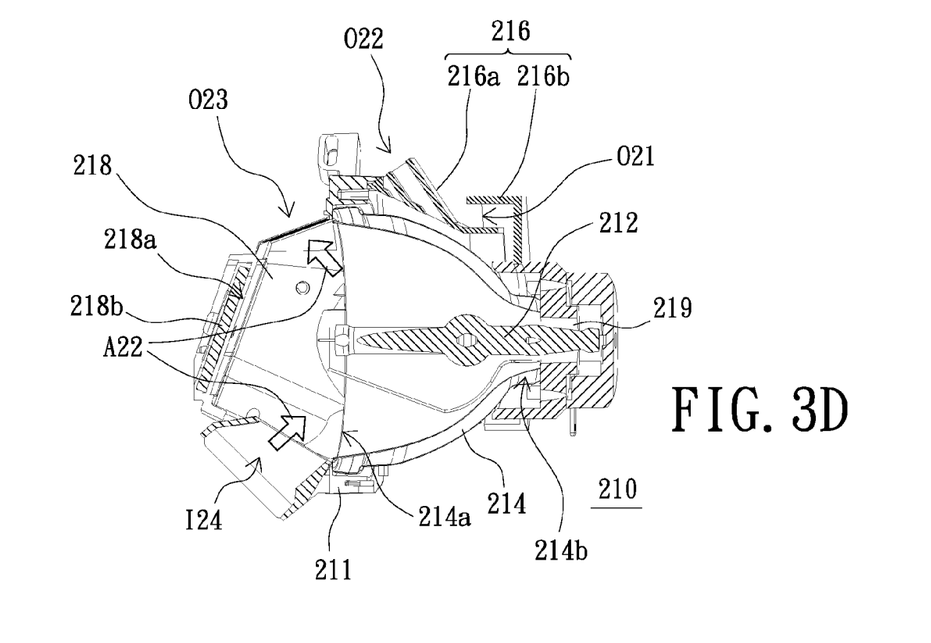
FIG. 3D is a schematic cutaway top view of the lamp of FIG. 3A.

FIG. 3A is a schematic top view of an illuminant module of FIG. 2. FIG. 3B is a schematic three-dimensional view of a lamp of FIG. 3A. FIG. 3C is a schematic cutaway three-dimensional view of the lamp of FIG. 3A. FIG. 3D is a schematic cutaway top view of the lamp of FIG. 3A. Referring to FIGS. 3A, 3B, 3C and 3D, the illuminant module 200 includes a lamp 210, a first airflow generator 220, and a second airflow generator 230. The lamp 210 includes a frame 211, a lampwick 212, a reflector 214, a shade 216, a protector 218, and a base 219. The lampwick 212 is disposed at the base 219. The reflector 214 has a first opening 214a and a bottom portion 214b opposite to the first opening 214a. The frame 211 is disposed at the reflector 214 and surrounds the first opening 214a. The base 219 is disposed at the bottom portion 214b. In the embodiment, the lampwick 212 is disposed at the bottom portion 214b through the base 219. The lampwick 212 passes through the bottom portion 214b and at least one part of the lampwick 212 is disposed in the reflector 214. The reflector 214 is capable of making light emitted by the lampwick 212 form the illumination light beam L1 passing through the first opening 214a (as shown in FIG. 2).

Figure 4A:
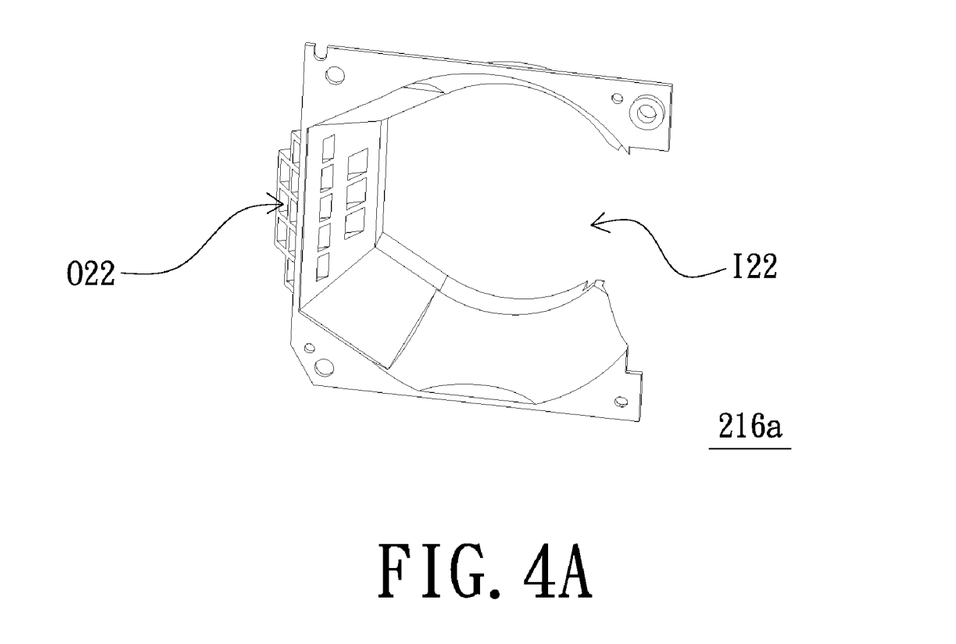
FIG. 4A is a schematic three-dimensional view of a heat-dissipating portion of a shade of FIG. 3A.
Figure 4B:
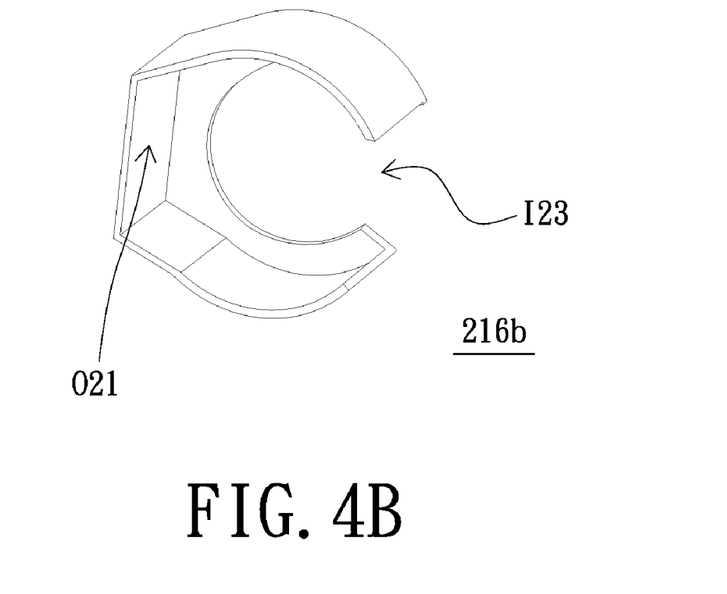
FIG. 4B is a schematic three-dimensional view of a heat-resisting flexible portion of the shade of FIG. 3A.

FIG. 4A is a schematic three-dimensional view of a heat-dissipating portion of a shade of FIG. 3A. FIG. 4B is a schematic three-dimensional view of a heat-resisting flexible portion of the shade of FIG. 3A. Referring to FIGS. 3A, 3B, 3C, 4A and 4B, the shade 216 is disposed outside the reflector 214 and covers a part of the reflector 214. The shade 216 is connected to the base 219 and has a first inlet I21, a first outlet O21, and a second outlet O22. In the embodiment, the shade 216 is connected to the bottom portion 214b through the base 219. The first inlet I21 and the first outlet O21 are disposed at two opposite sides of the reflector 214 respectively. The first inlet I21 and the second outlet O22 are disposed at the two opposite sides of the reflector 214 respectively. In the present embodiment, the shade 216 includes a heat-dissipating portion 216a and a heat-resisting flexible portion 216b. The heat-dissipating portion 216a is adjacent to the first opening 214a of the reflector 214 and has a second inlet I22. In specific, the heat-dissipating portion 216a is fixed to the frame 211.

The heat-resisting flexible portion 216b is adjacent to the heat-dissipating portion 216a and covers a part of the heat-dissipating portion 216a far from the first opening 214a. The heat-resisting flexible portion 216b is connected to the base 219 and has a third inlet I23 beside the second inlet I22. In the embodiment, the heat-resisting flexible portion 216b is connected to the bottom portion 214b through the base 219. The first inlet I21 is composed of the second inlet I22 and the third inlet I23. The first outlet O21 is disposed at the heat-resisting flexible portion 216b and the second outlet O22 is disposed at heat-dissipating portion 216a. In specific, in the embodiment, the heat-resisting flexible portion 216b surrounds a part of the base 219 and a part of the bottom portion 214b. The heat-resisting flexible portion 216b is disposed between the bottom portion 214b and the heat-dissipating portion 216a. In addition, the heat-dissipating portion 216a may be made of metal. The heat-resisting flexible portion 216b may be made of rubber.

Referring to FIGS. 3A, 3B, 3C and 3D again, the protector 218 is disposed at the first opening 214a of the reflector 214. The protector 218 has a fourth inlet I24, a third outlet O23, a second opening 218a, and a transparent element 218b. The transparent element 218b is disposed in the transmitting path of the illumination light beam L1 (as shown in FIG. 2). The transparent element 218b may be a filter disposed at the second opening 218a.

The first airflow generator 220 may be an axial fan adjacent to the first inlet I21 of the shade 216 and is adapted to generate a first air flow A21. The first air flow A21 flows into the space between the reflector 214 and the shade 216 through the first inlet I21 of the shade 216. At least one part of the first air flow A21 flows through the first outlet O21 of the shade 216 along a first flowing direction F1. A first included angle G1 defined between the first flowing direction F1 and a transmitting direction T1 of the illumination light beam L1 is an acute angle. In addition, at least one part of the first air flow A21 flows through the second outlet O22 of the shade 216 along a second flowing direction F2. A second included angle G2 defined between the second flowing direction F2 and the transmitting direction T1 of the illumination light beam L1 is an acute angle. In the embodiment, the first flowing direction F1 and the second flowing direction F2 may be same so that the first included angle G1 and the second included angle G2 may be same.

The second airflow generator 230 may be a blower adjacent to the fourth inlet I24 of the protector 218 and is adapted to generate a second air flow A22. The second air flow A22 flows through the fourth inlet I24 of the protector 218, the interior of the reflector 214, and the third outlet O23 of the protector 218.

When the illuminant module 200 operates, the first air flow A21 flowing into the space between the reflector 214 and the shade 216 may flow out of the space through the first outlet O21 and the second outlet O22 of the shade 216. Accordingly, compared with the conventional arts, the temperature of a side S21 of the reflector 214 and the shade 216 opposite to the first airflow generator 220 may be reduced and the shade 216 may be avoided being deformed due to high temperature. In other words, the heat-dissipating efficiency of the lamp 210 of the embodiment is improved.

It should be noted that in another embodiment, the base 219 may be omitted according to the designing requirement. Therefore, the lampwick 212 may be directly disposed at the bottom portion 214b and the shade 216 may be directly connected to the bottom portion 214b.

Second Embodiment

Figure 5A:
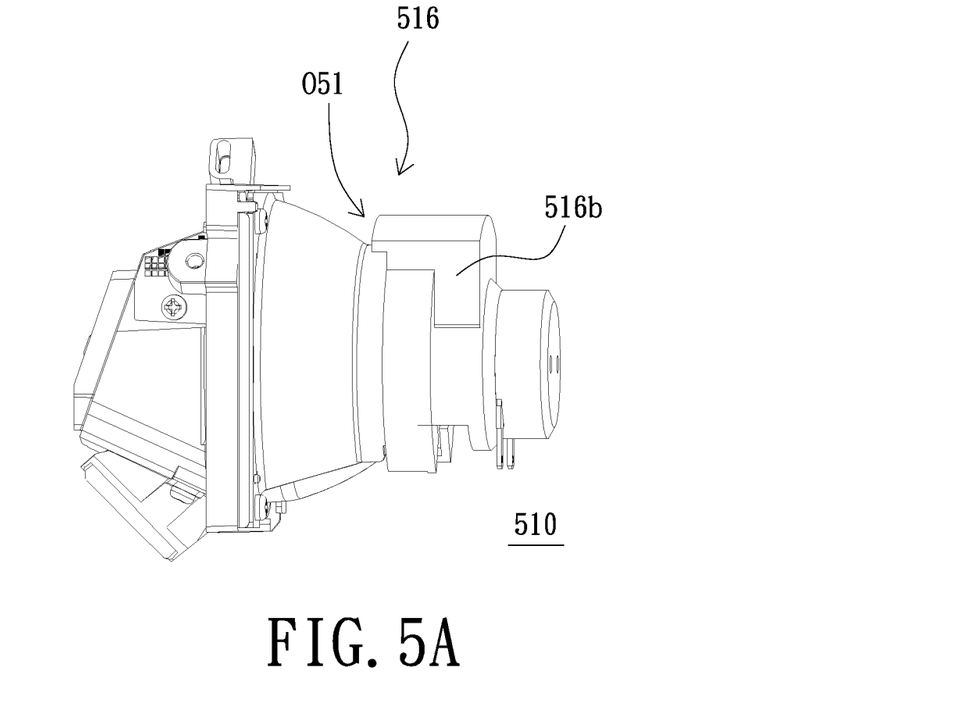
FIG. 5A is a schematic top view of a lamp in accordance with a second embodiment of the present invention.
Figure 5B:
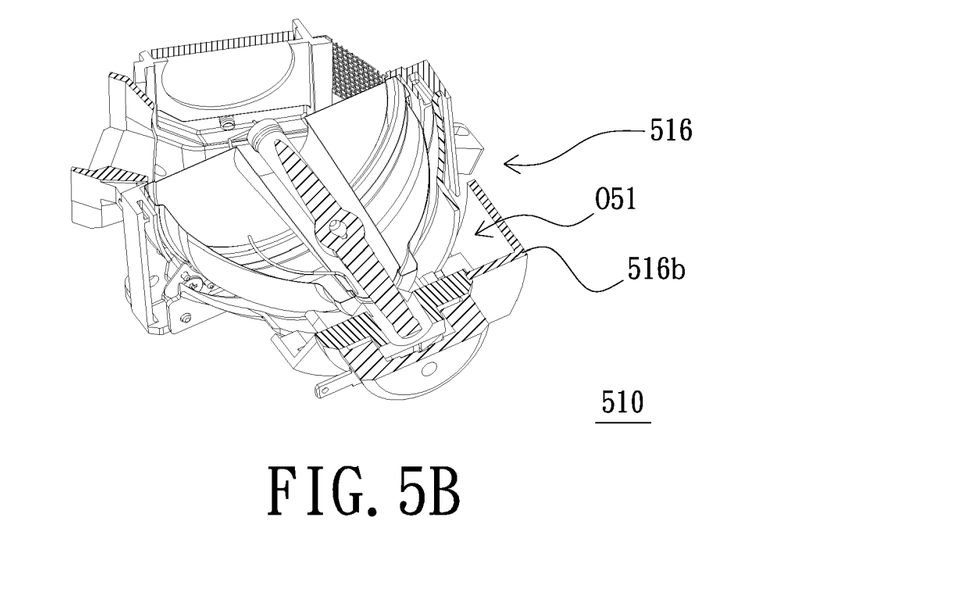
FIG. 5B is a schematic cutaway three-dimensional view of the lamp of FIG. 5A.

FIG. 5A is a schematic top view of a lamp in accordance with a second embodiment of the present invention. FIG. 5B is a schematic cutaway three-dimensional view of the lamp of FIG. 5A. Referring to FIGS. 5A, 5B and 3A, the difference between the lamp 510 of the second embodiment and the lamp 210 of the first embodiment lies in that a shade 516 does not have a second outlet O22. It should be pointed out that a first outlet O51 of the shade 516 is still disposed at a heat-resisting flexible portion 516b of the shade 516. In other words, if the heat-dissipating efficiency of the lamp 510 is not excessively inversely affected, a designer may omit the second outlet O22 according to the design requirement of the designer.

Third Embodiment

Figure 6A:
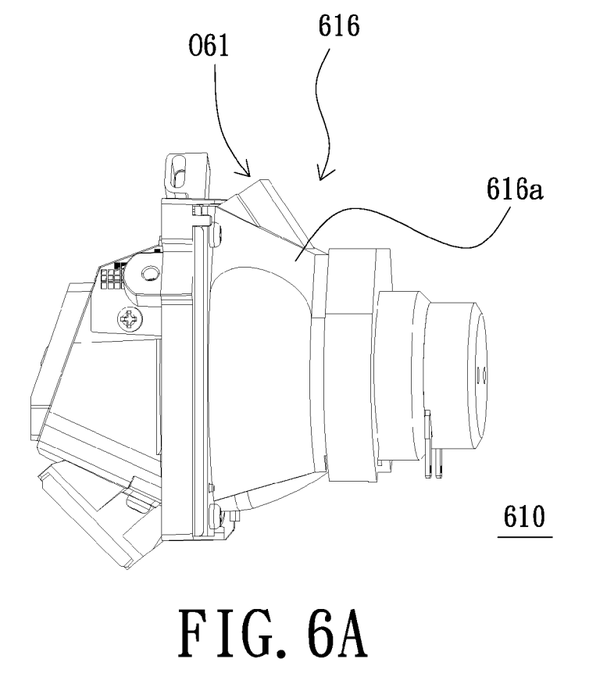
FIG. 6A is a schematic top view of a lamp in accordance with a third embodiment of the present invention.
Figure 6B:
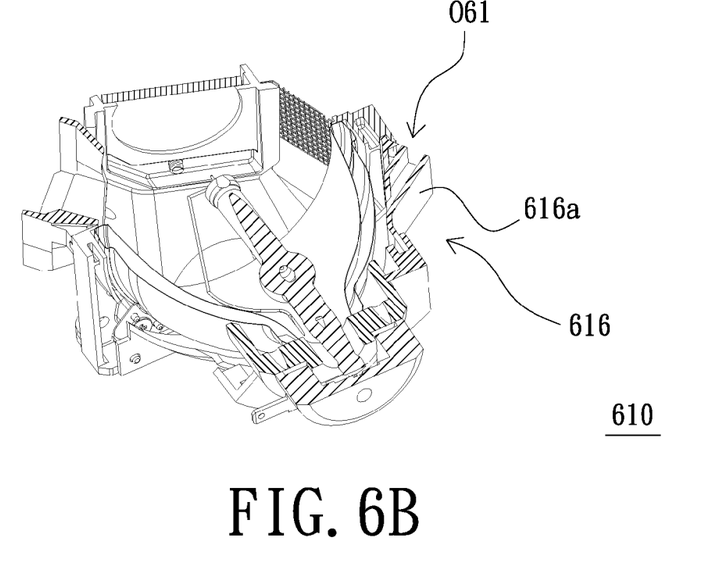
FIG. 6B is a schematic cutaway three-dimensional view of the lamp of FIG. 6A.

FIG. 6A is a schematic top view of a lamp in accordance with a third embodiment of the present invention. FIG. 6B is a schematic cutaway three-dimensional view of the lamp of FIG. 6A. Referring to FIGS. 6A, 6B and 5A, the difference between the lamp 610 of the third embodiment and the lamp 510 of the second embodiment lies in that a first outlet O61 of a shade 616 is disposed at a heat-dissipating portion 616a of the shade 616.

As mentioned above, the lamp and the optical projector of each of the embodiments of the present invention at least have one of the following advantages or other advantages. When the illuminant module of the optical projector operates, the first air flow flowing into the space between the reflector and the shade may flow out of the space through the first outlet of the shade. Accordingly, compared with the conventional arts, the temperature of the side of the reflector and the shade opposite to the first airflow generator may be reduced and the shade may be avoided being deformed due to high temperature. In other words, the heat-dissipating efficiency of the lamp of the embodiment of the present invention is improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lamp comprising:
   a lampwick;
   a reflector having a first opening and a bottom portion opposite to the first opening, the lampwick being disposed at the bottom portion and passing through the bottom portion, at least one part of the lampwick being disposed in the reflector, and the reflector being capable of making the light emitted by the lampwick form an illumination light beam passing through the first opening; and
   a shade disposed outside the reflector and covering a part of the reflector, the shade being connected to the bottom portion and having a first inlet and a first outlet, the first inlet and the first outlet being disposed at two opposite sides of the reflector respectively, the first inlet is adapted to allow a first air flow to flow through, the space between the reflector and the shade is adapted to allow the first air flow to flow into, the first outlet is adapted to allow at least one part of the first air flow to flow through along a first flowing direction, and a first included angle defined between the first flowing direction and a transmitting direction of the illumination light beam being an acute angle.

2. The lamp according to claim 1, wherein the shade comprises:
   a heat-dissipating portion adjacent to the first opening and having a second inlet; and
   a heat-resisting flexible portion adjacent to the heat-dissipating portion and covering a part of the heat-dissipating portion far from the first opening, the heat-resisting flexible portion being connected to the bottom portion and having a third inlet beside the second inlet, the first inlet being composed of the second inlet and the third inlet, and the first outlet being disposed at the heat-dissipating portion or the heat-resisting flexible portion.

3. The lamp according to claim 2, the heat-resisting flexible portion is disposed between the bottom portion and the heat-dissipating portion.

4. The lamp according to claim 2, further comprising a frame disposed at the reflector and surrounding the first opening, the heat-dissipating portion being fixed to the frame, and the heat-resisting flexible portion surrounding a part of the bottom portion.

5. The lamp according to claim 2, wherein the shade further comprises a second outlet, the first outlet being disposed at the heat-resisting flexible portion, the second outlet being disposed at the heat-dissipating portion, the first inlet and the second outlet being disposed at the two opposite sides of the reflector respectively, the second inlet is adapted to allow at least one part of the first air flow to flow through along a second flowing direction, and a second included angle defined between the second flowing direction and the transmitting direction of the illumination light beam being an acute angle.

6. The lamp according to claim 2, wherein the heat-dissipating portion is made of metal and the heat-resisting flexible portion is made of rubber.

7. The lamp according to claim 1, further comprising a protector disposed at the first opening, the protector having a fourth inlet, a third outlet, a second opening, and a transparent element, the second opening being disposed in a transmitting path of the illumination light beam, and the transparent element being disposed at the second opening.

8. The lamp according to claim 7, wherein the transparent element is a filter.

9. The lamp according to claim 1, further comprising a base disposed at the bottom portion, the lampwick being disposed at the base, and the shade being connected to the base.

10. An optical projector comprising:
an illuminant module comprising:
a lamp comprising:
a lampwick;
a reflector having a first opening and a bottom portion opposite to the first opening, the lampwick being disposed at the bottom portion and passing through the bottom portion, at least one part of the lampwick being disposed in the reflector, the reflector being capable of making the light emitted by the lampwick form an illumination light beam passing through the first opening; and
a shade disposed outside the reflector and covering a part of the reflector, the shade being connected to the bottom portion and having a first inlet and a first outlet, and the first inlet and the first outlet being disposed at two opposite sides of the reflector respectively; and
a first airflow generator adjacent to the first inlet and adapted to generate a first air flow, the first air flow flowing into the space between the reflector and the shade through the first inlet, at least one part of the air flow flowing through the first outlet along a first flowing direction, and a first included angle defined between the first flowing direction and a transmitting direction of the illumination light beam being an acute angle;
a light valve disposed in a transmitting path of the illumination light beam and adapted to convert the illumination light beam into an image light beam; and
a projection lens disposed in a transmitting path of the image light beam and adapted to project the image light beam onto a screen.

11. The optical projector according to claim 10, wherein the shade comprises:
a heat-dissipating portion adjacent to the first opening and having a second inlet; and
a heat-resisting flexible portion adjacent to the heat-dissipating portion and covering a part of the heat-dissipating portion far from the first opening, the heat-resisting flexible portion being connected to the bottom portion and having a third inlet beside the second inlet, the first inlet being composed of the second inlet and the third inlet, and the first outlet being disposed at the heat-dissipating portion or the heat-resisting flexible portion.

12. The optical projector according to claim 11, the heat-resisting flexible portion is disposed between the bottom portion and the heat-dissipating portion.

13. The optical projector according to claim 11, wherein the lamp further comprises a frame disposed at the reflector and surrounding the first opening, the heat-dissipating portion being fixed to the frame, and the heat-resisting flexible portion surrounding a part of the bottom portion.

14. The optical projector according to claim 11, wherein the shade further comprises a second outlet, the first outlet being disposed at the heat-resisting flexible portion, the second outlet being disposed at the heat-dissipating portion, the first inlet and the second outlet being disposed at the two opposite sides of the reflector respectively, at least one part of the first air flow flowing through the second outlet along a second flowing direction, and a second included angle defined between the second flowing direction and the transmitting direction of the illumination light beam being an acute angle.

15. The optical projector according to claim 11, wherein the heat-dissipating portion is made of metal and the heat-resisting flexible portion is made of rubber.

16. The optical projector according to claim 10, wherein the lamp further comprises a protector disposed at the first opening, the protector having a fourth inlet, a third outlet, a second opening, and a transparent element, the second opening being disposed in the transmitting path of the illumination light beam, the transparent element being disposed at the second opening, the illuminant module further comprising a second airflow generator adjacent to the fourth inlet, the second airflow generator being adapted to generate a second air flow, and the second air flow flowing through the fourth inlet, the interior of the reflector, and the third outlet.

17. The optical projector according to claim 16, wherein the transparent element is a filter.

18. The optical projector according to claim 10, wherein the lamp further comprises a base disposed at the bottom portion, the lampwick being disposed at the base, and the shade being connected to the base.

* * * * *